(12) United States Patent
Remy et al.

(10) Patent No.: US 7,628,925 B2
(45) Date of Patent: Dec. 8, 2009

(54) METHOD OF DEWATERING SLUDGE AND THE SLUDGE THUS DEWATERED

(75) Inventors: Marc Remy, Nil-Saint-Martin (BE); Eric Judenne, Paris (FR); Matthias Rohmann, Bad Sachsa (DE)

(73) Assignee: S.A Lhoist Recherche et Developpement, Limelette (BE)

( * ) Notice: Subject to any disclaimer, the term of this patent is extended or adjusted under 35 U.S.C. 154(b) by 499 days.

(21) Appl. No.: 10/563,470

(22) PCT Filed: Jul. 8, 2004

(86) PCT No.: PCT/EP2004/051422

§ 371 (c)(1),
(2), (4) Date: Jan. 4, 2006

(87) PCT Pub. No.: WO2005/014495

PCT Pub. Date: Feb. 17, 2005

(65) Prior Publication Data

US 2006/0144799 A1    Jul. 6, 2006

(30) Foreign Application Priority Data

Jul. 11, 2003 (BE) .................................. 2003/0401

(51) Int. Cl.
*C02F 11/14* (2006.01)

(52) U.S. Cl. ..................... 210/710; 210/725; 210/727; 210/769

(58) Field of Classification Search .................. 210/710
See application file for complete search history.

(56) References Cited

U.S. PATENT DOCUMENTS

| 3,527,702 | A | * | 9/1970 | Holluta et al. | ............... 210/749 |
| 4,028,238 | A | * | 6/1977 | Allan | ............... 210/711 |
| 4,675,114 | A | | 6/1987 | Zagyvai et al. | ............... 210/666 |
| 5,217,624 | A | * | 6/1993 | Yamane et al. | ............ 405/129.3 |
| 5,705,073 | A | * | 1/1998 | Loquenz et al. | ............. 210/631 |

FOREIGN PATENT DOCUMENTS

| DE | 3643205 | | 8/1984 |
| EP | 0 408 545 | | 1/1991 |
| GB | 2 134 508 | | 8/1984 |
| JP | 59046198 | * | 3/1984 |
| JP | 02063600 | | 3/1990 |

OTHER PUBLICATIONS

PCT/EP2004/051422 International Search Report, dated Nov. 8, 2004.

* cited by examiner

*Primary Examiner*—Peter A Hruskoci
(74) *Attorney, Agent, or Firm*—Charles D. Gunter, Jr.

(57) ABSTRACT

The invention concerns a method for dehydrating sludge, comprising adding a basic agent to sludge having a pH not more than 8, adding to the sludge at least one organic flocculating constituent, by adding said basic agent, increasing the sludge pH to a value not more than a pH at which occurs degradation of said at least one organic constituent, flocculating the sludge and separating in the flocculated sludge dehydrated sludge from a liquid phase, said basic agent being a magnesian limestone compound of formula $xCaCO_3,(1-x)[yMg(OH)_2+(1-Y)MgO]$, wherein $0,45 \leq x \leq 0,75$, and $0 \leq y \leq$, the treated sludge having, until after said separation, said value less than a pH at which occurs degradation of said at least one organic constituent.

10 Claims, 1 Drawing Sheet

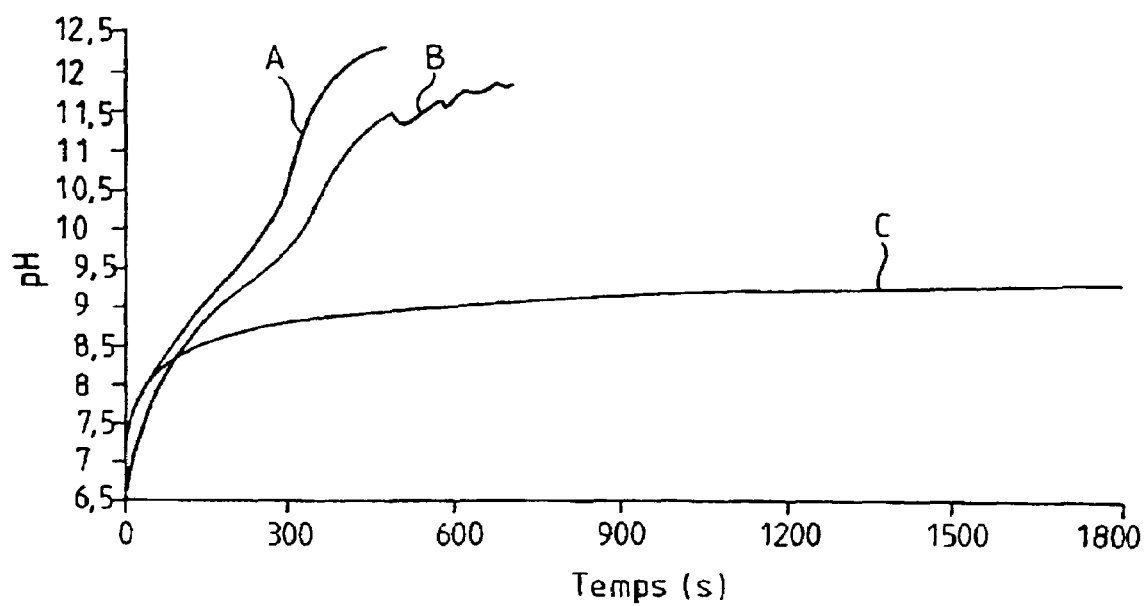

METHOD OF DEWATERING SLUDGE AND THE SLUDGE THUS DEWATERED

The present invention relates to a method of dewatering sludge, comprising addition of a basic agent to sludge having a pH equal to or less than 8, addition to the sludge of at least one flocculating organic component, by the addition of the above mentioned basic agent, an increase in pH of the sludge to a value less than a pH as from which degradation of the said at least one organic component takes place, flocculation of the sludge, and separation of the flocculated sludge between dewatered sludge and a liquid phase, and to the sludge thus dewatered.

Sludge, within the meaning of the present invention, means all sludge whose initial pH is less than or equal to 8, such as, for example, sludge of purification plants for urban and food-industry waste water. Dredging sludge can also be envisaged, as well as other possibly more acid sludge. In this case, this sludge is advantageously previously brought within a pH range of at least 6 and no more than 8, by neutralisation.

In general terms, this sludge is, during its treatment, first of all settled before being thickened. It is then subjected to flocculation, followed by dewatering, carried out, in the majority of cases, by means of a belt filter, a filter press or a centrifuge, with or without heating. Apart from the reduction in volume, the purpose of this treatment is to facilitate the handling, storage and transport of this sludge.

The dewatering of sludge by means of flocculants is well known. Provision has also already been made, for example, for the treatment of fishery sludge, of associating with the flocculant an agent assisting the flocculation, which is a water-soluble calcium compound (see for example JP-A-4-40286). Use is made, by way of calcium compound, either of highly basic compounds of the lime type, or calcium salts such as halides, nitrate or acetate. The objective sought is a purified water resulting from the treatment of the sludge.

A method of dewatering sludge is also known in which provision is made, after the treatment of the sludge with a polymer flocculant, for adjusting the pH to a value of between 9 and 12 by the addition of calcium or magnesium oxide or hydroxide (see U.S. Pat. No. 4,675,114). This method also requires the addition to the sludge of formaldehyde, which is a recognised toxic substance that poses environmental problems and which is therefore to be avoided.

All these prior methods, which preferentially use lime for assisting the flocculation, require the increase in pH to be sufficiently controlled so as to prevent any excessively rapid degradation of the flocculant, which becomes inactive at a very basic pH. Some methods even provide for neutralisation during the method, with its consequences on the cost and on the quantity of water to be eliminated during the filtration.

To achieve this control, provision has been made for a method as indicated at the start, in which use is made, as a basic agent, of a highly basic calcic compound that is treated to retard the increase in pH of the medium as soon as this compound is added up to the end of the flocculation, the pH then being able to continue this rise in the sludge, preferably even after dewatering of the treated sludge (see WO-00/47527).

However, in order to delay the increase in pH, the calcic compound must undergo prior treatments, for example:

an increase in the average size of the grains of the calcic additive, in particular in order to avoid the presence of particles of less than 50 µm, which requires a filler removal or agglomeration operation, the addition of an organic compound in order to delay the dissolution of the calcic compound, the overburning of the calcic compound, which thus becomes less reactive.

These prior operations are expensive and in some cases introduce foreign additives into the sludge. In addition, the pH is despite everything not maintained within a range compatible with the use of a flocculant except for a very short time (a few minutes), which makes the filtration operation before the end of this period difficult.

Moreover, a method of inerting and/or immobilising harmful substances in materials of the sludge type is also known, this method comprising an addition to these materials of at least one hydraulic binder, this mixture having added to it an inorganic material containing magnesium compound and/or an inorganic material containing aluminium compounds (see EP-B-0408545).

The aim of the present invention is to remedy the aforementioned drawbacks and to develop an easy sludge dewatering method making it possible to obtain sludge having favourable use properties, such as good stability in a heap, ability to be shovelled, etc. The sludge obtained must preferably have a high dry matter content, whilst making use of the flocculants normally utilised for flocculating sludge.

To resolve these problems, there has been provided, according to the invention, a method as described at the start, in which the above mentioned basic agent is a calcaro-magnesian compound complying with the formula

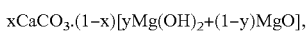

$$xCaCO_3.(1-x)[yMg(OH)_2+(1-y)MgO],$$

in which x and y are molar fractions $0.45 \leq x \leq 0.75$, and $0 \leq y \leq 1$, and the treated sludge has, until after the said separation, the said value lower than a pH as from which degradation of the said at least one organic component takes place.

The particular advantage of this method is that the separation, that is to say dewatering, step does not have any time constraint imposed on it, since the increase in pH necessary remains controlled.

It became clear in fact, unexpectedly, that it was possible to obtain, by the addition of the calcaro-magnesian compound according to the invention, both an astonishingly high level of dry matter in the dewatered sludge and at the same time a gentle and even increase in pH up to a maximum pH, which remains below the pH where the normal flocculants for sludge flocculation lose their activity, in particular a pH less than or equal to ten. The operations of settling, filtration, pressing and/or centrifugation can be undertaken without hurry and risk of reaching an excessively high pH. The dewatered sludge according to the method of the invention can attain dry matter levels above 75% by weight, advantageously 80% by weight and even up to 90% by weight and more. It should also be noted that the sludge continues to have the pH existing at the time of separation.

Moreover, when the dryness of the dewatered sludge obtained according to the method of the invention is determined, there is unexpectedly found a substantial increase in dryness compared with the dryness that would have been obtained if the same quantity of calcaro-magnesian compound according to the invention had been added after dewatering of the treated sludge. This dryness after treatment is calculated by means of the following formula $$S2_{cal} = \frac{S1 \times (100 + t)}{100 + (S1 \times (t/100))}$$

where

S1 is the dry matter content of the sludge cake without calcaro-magnesian compound according to the invention, as a percentage by weight, t is the degree of addition of calcaro-magnesian compound according to the invention, expressed as a percentage by weight with respect to the dry matter contained in the thickened sludge, and $S2_{cal}$ is the calculated dry matter content of the sludge cake with calcaro-magnesian compound according to the invention, as a percentage by weight, when it is accepted that there is no additional effect of the calcaro-magnesian compound on the dryness of the cake.

Preferentially, the calcaro-magnesian compound according to the invention is what is termed a half-burnt dolomite, of formula $CaCO_3.MgO$, where the MgO component may be partially or totally in the form of $Mg(OH)_2$. This half-burnt dolomite can be obtained by controlled burning of a double calcium and magnesium carbonate, under conditions such that the residual content by weight of CaO is less than 5% and that of $MgCO_3$ is less than 10%. The size of the half-burnt dolomite used is preferably less than or equal to 5 mm. This compound is mixed with the sludge before, simultaneously with or after the flocculant. Naturally such a compound may contain, according to its mineral origin, a few impurities, such as for example silica or alumina.

When the value of x in the formula given above is less than 0.45, this gives a product which cannot be obtained from a double calcium and magnesium carbonate of natural origin. When the value of x is above 0.75, the lime component of the calcaro-magnesian compound becomes too great and no longer allows a sufficient rise in pH and in particular prevents any satisfactory gain in dryness of the dewatered sludge.

In the case of the use of non-hydrated half-burnt dolomite, this basic agent also, in addition to being an addition of dry material and assisting the flocculation and filterability of the sludge, has the advantage of causing partial drying of the sludge by reaction of the MgO component with water.

The addition of the calcaro-magnesian compound to the sludge according to the invention not only significantly extends the contact time of the basic agent with the flocculant without denaturing it, but also, unexpectedly, makes it possible to achieve dryness yields very much greater than those obtained with the solutions currently known, in addition with a compound which requires no agglomeration or filler removal operation. The size of the half-burnt dolomite grains is in no way critical in the method according to the invention.

According to a preferred embodiment of the invention, the method comprises, after the said separation, an incineration of the dewatered sludge.

Other embodiments of the method according to the invention are indicated in the accompanying claims.

The present invention also concerns the use of a calcaro-magnesian compound complying with the formula $$xCaCO_3.(1-x)[yMg(OH)_2+(1-y)MgO],$$

in which x and y are molar fractions $0.45 \leqq x \leqq 0.75$, and $0 \leqq y \leqq 1$, for the treatment and dewatering of sludge having a pH equal to or less than 8.

The invention also concerns dewatered sludge comprising a calcaro-magnesian compound content complying with the formula $xCaCO_3.(1-x)[yMg(OH)_2+(1-y)MgO]$, in which x and y are molar fractions, $0.45 \leqq x \leqq 0.75$, and $0 \leqq y \leqq 1$, and having a pH higher than 8 and equal to or less than 10. This sludge advantageously comprises at least 15% by weight of the calcaro-magnesian compound compared with the dry matter of the sludge before dewatering.

The invention will now be explained in more detail with the help of the non-limiting examples given below.

EXAMPLE 1

A sample of thickened sludge having a dry matter content of approximately 3% by weight was treated with three different reagents, namely two calcic compounds—a quicklime with filler removal by sieving to 100 μm and an overburned quicklime—and a half-burnt dolomite ($d_{50}$=25–30 μm), according to the present invention. The same operating method was followed in the three cases.

A quantity of thickened sludge corresponding to 5 g of dry matter was introduced into a one-liter receptacle.

To this sample 1.5 g of additive was added; the mixture was then stirred by means of a magnetic bar and the pH of the solution was recorded every five seconds. The change in pH in each of the cases appears in the figure.

The accompanying figure is a graph showing the change in the pH as a function of time when the sludge is conditioned with a quicklime with filler removed (curve A)

an overburned quicklime (curve B)

a half-burnt dolomite according to the invention (curve C).

It can be seen that only the use of the half-burnt dolomite according to the invention does not raise the pH to a value above 9.5 beyond five minutes. This pH value is kept constant for at least half an hour, which allows a significant delay between the addition of the reagent and the dewatering operation.

EXAMPLE 2

Filtration of a sludge conditioned by means of a normal cationic organic flocculant and half-burnt dolomite according to the invention.

There is introduced into a one liter receptacle a thickened sludge, having a dry matter of 3%, in a quantity corresponding to 5 g of dry matter. This sample of sludge is then treated according to the following procedure.

Conditioning

According to the invention, there are added successively to the sludge a quantity of half-burnt dolomite, corresponding to 45% of the dry matter present in the sample of sludge, and 10 ml of aqueous solution of flocculant, at 5 g/l of active material. The mixture is then stirred for ten seconds at a speed of 200 revolutions per minute by means of a laboratory flocculator.

Filtration

The sludge thus conditioned is then filtered on a Büchner filter, the filtering part of which is covered with a polyester filtration cloth (type NORDIFA Lainyl M14/CH/5 Fi).

The sludge is then left to drain for one minute. There are next applied, to the drained sludge, successively pressures of 1, 2, 3 and 4 bar by means of a piston, each pressure stage lasting for one minute. A cake with a thickness of 3 to 5 mm is obtained. The central part thereof is sampled with a view to determining its dry matter content, that is to say 25.3%.

In order to be able to evaluate the influence of the addition of half-burnt dolomite according to the invention on the dry matter content of the filtration cake, in a second test the same thickened sludge was flocculated and then filtered in accordance with the protocol described above, but this time without the addition of half-burnt dolomite. A cake of sludge having a dry matter content of 16.4% was obtained.

If the effect of the calcined dolomite was limited to the addition of dry matter to the sludge, without additional effect on the dryness, the calculated dry matter content of the cake of sludge $S2_{cal}$ in the presence of half-burnt dolomite would be obtained at the start of the dry matter content of the cake of sludge without the addition of dolomite S1, by means of the formula given previously.

In this example, $$S2_{cal} = \frac{16.4 \times (100 + 45)}{[100 + (16.4 \times 45/100)]}$$

that is to say 22.1%. Moreover, the actual content of the cake of sludge with half-burnt dolomite $S2_{eff}$ is 25.3%. The difference between $S2_{eff}$ and $S2_{cal}$, referred to $S2_{cal}$, shows that the addition of half-burnt dolomite according to the invention makes it possible to obtain a relative increase in dryness of 14.3%, which testifies to an unexpected additional effect of the half-burnt dolomite on the dryness of the cake.

By way of comparison, limestone was used to replace the half-burnt dolomite according to the invention under the same operating conditions and the dry matter content $S2_{eff}$ obtained was 22.7%. If this value was compared with $S2_{cal}$, the difference is in the order of magnitude of the experimental error and it can therefore not be concluded that there is a gain in dryness when limestone is used.

It can also be added that limestone is not a basic agent and that, when it is added, the pH of the sludge does not increase and in the present example remains around 7.35.

EXAMPLE 3

An urban purification plant sludge after primary settling has a dry matter content of approximately 3% by weight. This sludge, after flocculation with a cationic flocculant of the polyacrylamide type, and dewatering on a drying filter press, has a dry matter content or dryness after treatment of 64% by weight.

The same sludge, treated under identical conditions with the addition of 25% by weight of half-burnt dolomite (with respect to the dry matter of the sludge) after dewatering on a drying filter press, has a dryness of 80% by weight.

Finally, the sludge is flocculated under the same conditions as described above, but in the presence of 25% by weight of half-burnt dolomite, before dewatering. This sludge, after dewatering on a drying filter press, attains a dryness of 97% by weight.

It is therefore found that, unexpectedly, the addition of the calcaro-magnesian compound according to the invention very appreciably improves the dryness yields of the sludge treated compared with a simple addition of flocculant. Moreover, the same quantity of half-burnt dolomite, added before dewatering in the presence of flocculant, results in a very significant improvement in the dryness level compared with addition subsequent to dewatering. It must also be stated that the reagent mixing/sludge flocculation step may, in the present case, be as long as an hour and a half, which is excluded when use is made of lime, and even calcic reagents treated in order to slow down the rise in pH, such as those used above.

The co-addition of half-burnt dolomite according to the invention and a flocculating organic compound before the dewatering of the sludge has not only the advantage of improving the dryness compared with the method of addition after dewatering, with the same quantities of dolomite, but also simplifies the conduct of the method. This is because the mixing of the two additives (flocculant and reagent) can be carried out in a single step, whilst the operation of an addition after dewatering requires a second mixing step which, in addition, is more difficult to perform, having regard to the reduced water content after dewatering.

It must be understood that the present invention is in no way limited to the embodiments described above and that many modifications can be made thereto without departing from the scope of the accompanying claims.

The invention claimed is:

1. Method of dewatering sludge, comprising
addition of a basic agent to sludge having a pH equal to or less than 8,
addition to the sludge of at least one cationic polyacrylamide flocculant,
by the addition of the above mentioned basic agent, an increase in pH of the sludge to a value less than a pH as from which degradation of said at least one flocculant takes place,
flocculation of the sludge, and
separation of the flocculated sludge between dewatered sludge and a liquid phase, wherein the addition of said basic agent increases dryness in said dewatered sludge,
wherein the above mentioned basic agent is a calcaro-magnesian compound complying with the formula

$xCaCO_3.(1-x)[yMg(OH)_2+(1-y)MgO]$, in which
x and y are molar fractions
$0.45 \leq x \leq 0.75$, and
$0 \leq y \leq 1$,
and in that said sludge has, until after the said separation, said value lower than a pH as from which degradation of said at least one flocculating flocculant takes place.

2. Method according to claim 1 wherein the calcaro-magnesian compound is a half-burnt dolomite, comprising a MgO component.

3. Method according to claim 2, wherein the half-burnt dolomite issues from a burning of double calcium and magnesium carbonate under conditions such that it has a CaO content of less than 5% by weight and an $MgCO_3$ content of less than 10% by weight.

4. Method according to claim 1, comprising said increase in pH to a value of no more than 10.

5. Method according to claim 4, wherein the addition of the calcaro-magnesian compound takes place prior to, simultaneously with and/or after the addition of said at least one flocculant.

6. Method according to claim 4, wherein the addition of the calcaro-magnesian compound takes place before the above mentioned separation step.

7. Method according to claim 4, comprising, after said separation, an incineration of the dewatered sludge.

8. Method according to claim 4, wherein the sludge to dewater is an acid sludge and the method comprises also a prior neutralization of this acid sludge so that it has a pH of at least 6.

9. Method according to claim 4, wherein the calcaro-magnesian compound is a half-burnt dolomite, comprising a MgO component partially in the form of $Mg(OH)_2$.

10. Method according to claim 4, wherein the calcaro-magnesian compound is a half-burnt dolomite, comprising a MgO compound totally in the form of $Mg(OH)_2$.

* * * * *